(12) United States Patent
Guruswamy

(10) Patent No.: US 8,095,982 B1
(45) Date of Patent: Jan. 10, 2012

(54) ANALYZING THE SECURITY OF COMMUNICATION PROTOCOLS AND CHANNELS FOR A PASS-THROUGH DEVICE

(75) Inventor: Kowsik Guruswamy, Sunnyvale, CA (US)

(73) Assignee: Mu Dynamics, Inc., Sunnyvale, CA (US)

(*) Notice: Subject to any disclaimer, the term of this patent is extended or adjusted under 35 U.S.C. 154(b) by 1533 days.

(21) Appl. No.: 11/351,402

(22) Filed: Feb. 10, 2006

Related U.S. Application Data

(60) Provisional application No. 60/662,430, filed on Mar. 15, 2005.

(51) Int. Cl.
*G06F 21/00* (2006.01)
*G06F 15/16* (2006.01)
*G06F 11/30* (2006.01)

(52) U.S. Cl. .............................. 726/25; 726/23; 709/224

(58) Field of Classification Search .................. 370/401; 701/33; 709/227; 726/22–25
See application file for complete search history.

(56) References Cited

U.S. PATENT DOCUMENTS

| | | | |
|---|---|---|---|
| 5,892,903 A | 4/1999 | Klaus | |
| 6,584,569 B2 | 6/2003 | Reshef et al. | |
| 7,272,650 B2* | 9/2007 | Elgebaly et al. | 709/227 |
| 7,471,999 B2* | 12/2008 | Taki | 701/33 |
| 7,509,675 B2 | 3/2009 | Aaron | |
| 7,664,845 B2* | 2/2010 | Kurtz et al. | 709/224 |
| 2001/0034847 A1 | 10/2001 | Gaul, Jr. | |
| 2003/0051163 A1* | 3/2003 | Bidaud | 713/201 |
| 2003/0154399 A1 | 8/2003 | Zuk et al. | |
| 2005/0044418 A1 | 2/2005 | Miliefsky | |
| 2005/0135391 A1* | 6/2005 | Sung | 370/401 |
| 2005/0273854 A1* | 12/2005 | Chess et al. | 726/22 |
| 2006/0005231 A1 | 1/2006 | Zuk et al. | |
| 2006/0021049 A1 | 1/2006 | Cook | |
| 2006/0106939 A1* | 5/2006 | Cha et al. | 709/230 |
| 2006/0137009 A1* | 6/2006 | Chesla | 726/22 |
| 2007/0094728 A1 | 4/2007 | Julisch et al. | |
| 2008/0092237 A1* | 4/2008 | Yoon et al. | 726/25 |
| 2009/0328190 A1* | 12/2009 | Liu et al. | 726/14 |
| 2010/0284282 A1* | 11/2010 | Golic | 370/242 |
| 2010/0284283 A1* | 11/2010 | Golic et al. | 370/242 |

OTHER PUBLICATIONS

Bellovin, S., "A Technique for Counting NATted Hosts," Proceedings: Second Internet Measurement Workshop (IMW), Marseille, France, Nov. 6-8, 2002, pp. 267-272.

Bradner, S. et al., "Benchmarking Methodology for Network Interconnect Devices (RFC 1944)," May 1996, [online] [Retrieved on May 12, 2006] Retrieved from the Internet <URL: http://rfc.net/rfc1944.html>.

Bradner, S. et al., "Benchmarking Methodology for Network Interconnect Devices (RFC 2544)," Mar. 1999, [online] [Retrieved on May 12, 2006] Retrieved from the Internet <URL: http://rfc.net/rfc2544.html>.

(Continued)

*Primary Examiner* — Christopher Revak
(74) *Attorney, Agent, or Firm* — K&L Gates LLP

(57) ABSTRACT

A security analyzer includes a single software application that both sends test messages to a device under analysis (DUA) and receives response messages generated by the DUA in response to the test messages. In this way, synchronization of which response messages correspond to which test messages can be reduced or avoided. The software application further determines whether the DUA operated correctly by analyzing the received response messages.

35 Claims, 3 Drawing Sheets

OTHER PUBLICATIONS

Cisco Systems, Inc., "Mobile IP—NAT Detect" in "Cisco IOS IP Mobility Configuration Guide, Release 12.4," 2005, [online] [Retrieved on May 12, 2006] Retrieved from the Internet <URL: http://www.cisco.com/univercd/cc/td/doc/product/software/ios124/124cg/himo_c/ch05/hnatrav.pdf>.

Dunn, J. et al., "Methodology for ATM Benchmarking (RFC 3116)," Jun. 2001, [online] [Retrieved on May 12, 2006], Retrieved from the Internet <URL: http://rfc.net/rfc3116.html>.

Egevang, K., et al., "The IP Network Address Translator (NAT) (RFC 1631)," May 1994, [online] [Retrieved on May 12, 2006] Retrieved from the Internet <URL: http://rfc.net/rfc1631.html>.

Microsoft Corp., "Overview of Network Address Translation (NAT) in Windows XP," Sep. 12, 2005, [online] [Retrieved on May 12, 2006] Retrieved from the Internet <URL: http://www.microsoft.com/technet/prodtechnol/winxppro/deploy/nattrnsv.mspx?pf=true>.

Netcom Systems, "SmartWindow User Guide Version 6.53," Document No. 340-1020-001 Rev C, Dec. 1999, [online] [Retrieved on May 12, 2006] Retrieved from the Internet <URL: http://cobra.ee.ntu.edu.tw/~oops/HTML6/08_exp/smartbit%20reading.pdf>.

Nikolic, M., "Performance Measurements of Multimedia Transmissions in IP over ATM Networks," Master's Thesis, School of Engineering Science, Simon Fraser University, Dec. 2002, [online] [Retrieved on May 12, 2006] Retrieved from the Internet <URL: http://142.58.111.30/~ljilja/cnl/pdf/milan.pdf>.

Sorensen, S., "Intrusion Detection and Prevention: Protecting Your Network from Attacks," Document No. 200065-002, 2006, [online] [Retrieved on May 12, 2006] Retrieved from the Internet <URL: http://www.juniper.net/solutions/literature/white_papers/200065.pdf>.

Srisuresh, P. et al., "IP Network Address Translator (NAT) Terminology and Considerations (RFC 2663)," Aug. 1999, [online] [Retrieved on May 12, 2006] Retrieved from the Internet <URL: http://rfc.net/rfc2663.html>.

Srisuresh, P. et al., "Traditional IP Network Address Translator (Traditional NAT) (RFC 3022)," Jan. 2001, [online] [Retrieved on May 12, 2006] Retrieved from the Internet <URL: http://rfc.net/rfc3022.html>.

Trend Communications, "RFC 2544 Testing with Aurora Tango," date unknown, [online] [Retrieved on May 12, 2006] Retrieved from the Internet <URL: http://www.trendtest.co.uk/trendweb/resource.nsf/vIFileURLLookup/en%5E%5ERFC+2544+testing/$FILE/GbEnet.2544.test.pdf>.

Udupa, R. et al., "Performance Issues and Evaluation Techniques for Networking Devices," 2001, [online] [Retrieved on May 12, 2006] Retrieved from the Internet <URL: http://softwaredioxide.com/Channels/events/testing2001/Presentations/raghavendra_infosys.pdf>.

PCT International Search Report and Written Opinion, PCT/US06/09512, Aug. 31, 2006, 7 pages.

* cited by examiner

ANALYZING THE SECURITY OF COMMUNICATION PROTOCOLS AND CHANNELS FOR A PASS-THROUGH DEVICE

REFERENCE TO RELATED APPLICATIONS

This application claims priority from the following provisional application, which is hereby incorporated by reference in its entirety: U.S. Application No. 60/662,430, filed on Mar. 15, 2005, entitled "Automated Robustness and Security Testing of Network Devices". This application is related to the following utility applications, which are hereby incorporated by reference in their entirety: U.S. application Ser. No. 11/351,403, filed on Feb. 10, 2006, entitled "Platform for Analyzing the Security of Communication Protocols and Channels" and U.S. application Ser. No. 11/351,409, filed on Feb. 10, 2006, entitled "Portable Program for Generating Attacks on Communication Protocols and Channels".

BACKGROUND

The present invention relates to a single software application acting as both the sender and recipient of a message sent over a single network channel.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

A proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. For example, one or more messages are sent to the DUA, and the DUA responds by generating one or more messages in return.

The sent messages and return messages can be analyzed to determine whether the DUA operated correctly. Usually, a pair of messages is considered, where the first message (or test message) was received by the DUA and the second message (or response message) was generated by the DUA in response to the first message. Depending on the type of DUA, the second message might be identical to the first message, similar to the first message, or radically different from the first message. For example, if the DUA is a switch, bridge, or router, it might merely relay the first message without modifying it. If the DUA is an anti-virus gateway, it might modify the first message by quarantining and removing an attachment that contains a virus. If the DUA is a decryption device, it might generate a decrypted message (the second message) based on the encrypted message that it received (the first message).

However, before the pair of messages can be analyzed, the correct response message must be matched up with the correct test message. If the analysis is automated, a large number of messages may be sent to the DUA during a short period of time, with the DUA generating an equally large number of messages in responses. It may not be obvious which of the response messages was generated in response to which of the test messages. If one device or devices generate the test messages and another device or devices receive the response messages, some method to synchronize the sending devices and receiving devices is usually required so that response messages can be matched up with the corresponding test messages. However, the synchronization requirement can add complexity and cost to the overall system.

Therefore, there is a need for security analysis approaches that can test pass-through devices, and match test and response messages, in a more efficient manner.

SUMMARY

The present invention overcomes limitations of the prior art by providing a security analyzer for analyzing a security of a device under analysis (DUA). In one embodiment, the security analyzer comprises a single software application that both sends test messages to the DUA and receives response messages generated by the DUA in response to the test messages. In this way, synchronization of which response messages correspond to which test messages can be reduced or avoided. The software application further determines whether the DUA operated correctly by analyzing the received response messages. In one implementation, the software application is contained as part of a portable appliance that can be transported to different locations to analyze the security of different devices.

In various applications, the security analyzer generates test messages to test a communications protocol of the DUA, to test a channel of the DUA and/or to test an overall security of the DUA. The security analyzer may generate a first test message and then a second test message before a response message for the first test message is received. In this way, the security analysis can be accelerated.

In another aspect of the invention, in a method for analyzing a security of a device under analysis (DUA), a single software application performs the following steps. A connection is established to a DUA, for example by establishing a sending side of the connection, establishing a receiving side of the connection and establishing the connection from the sending side through the DUA to the receiving side. Test messages are sent to the DUA from the sending side of the connection. Response messages are received from the DUA at the receiving side of the connection. Whether the DUA operated correctly is determined by analyzing the received response messages. In one application, the messages are analyzed to determine whether the DUA is performing network address translation (NAT).

Other aspects of the invention include software, systems, components and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
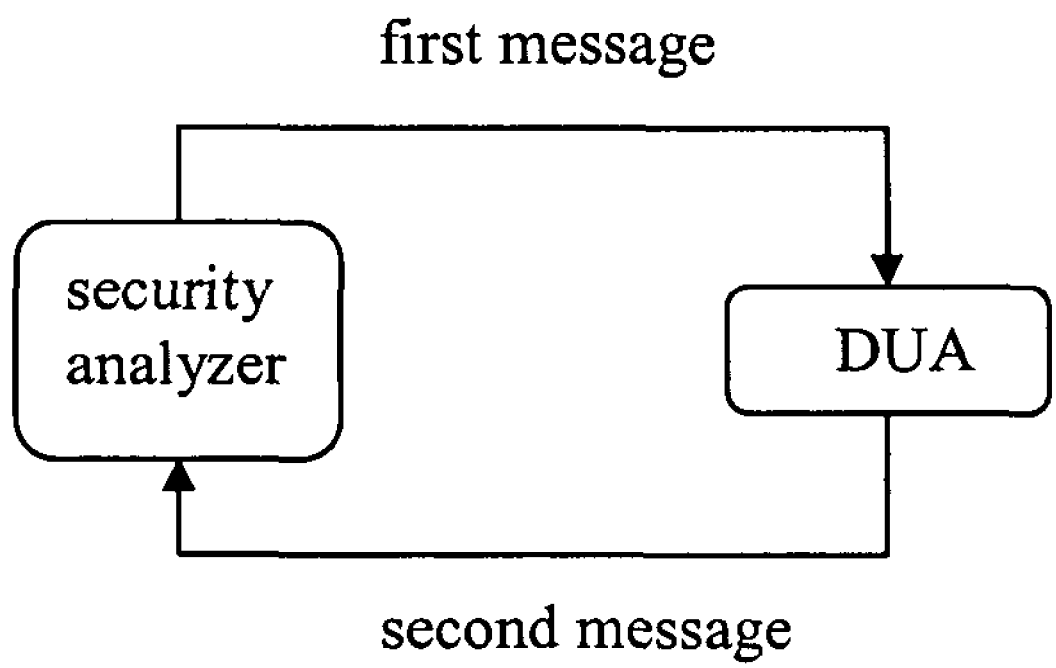
FIG. 1 illustrates a system that includes a security analyzer, a device-under-analysis, a first test message, and a second response message, according to one embodiment of the invention.

A security analyzer tests a device-under-analysis (DUA) by sending one or more test messages to the DUA, receiving one or more response messages from the DUA, possibly continuing the message exchange further, and then analyzing the received messages. Specifically, the security analyzer determines whether the DUA operated correctly by considering a pair of messages (or possibly more if a lengthier message exchange is involved), where the first message was sent to the DUA and the second message was generated by the DUA in response to the first message. FIG. 1 illustrates a system that includes a security analyzer, a device-under-analysis, a first message, and a second message, according to one embodiment of the invention.

In the following description, "device", "device-under-analysis", and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA can also be multiple devices that are communicatively coupled to form a system or network of devices. For example, a DUA can be two firewall devices that establish an encrypted tunnel between themselves. There can also be devices located between the security analyzer and the DUA, although FIG. 1 omits such devices for clarity.

In one embodiment, a security analyzer tests the communication protocols and/or channels of a device. A "protocol" refers to an exchange of data or messages in a known, structured format. Specifically, a protocol refers to what is being communicated (for example, the data or message content). A security analyzer can test various types of communication protocols, regardless of whether they are public or proprietary. Types of protocols include, for example, networking protocols (including network packets), application program interfaces (APIs; including API calls, remote method invocation (RMI), and remote procedure call (RPC)), and file formats. Appendix A contains exemplary networking protocols, APIs, and file formats.

A protocol generally has three characteristics: structure, semantics, and state. Therefore, when a security analyzer tests a protocol, it tests the protocol's structure, semantics, and/or state. Protocol structure refers to the layout of a message, such as its fields, arguments, or parameters, and its possible length. Protocol semantics refers to the context of a message, such as its actual content and what the content means. Protocol state refers to how the history of previous messages affects later messages. Appendix B contains types of attacks to test a protocol's structure, semantics, and/or state.

A "channel" refers to how protocol data is communicated. Specifically, a channel refers to how a message is delivered to a DUA (for example, using Ethernet on top of a wireless network). One example of a channel attack is sending too many messages at once, thereby flooding a network and resulting in a denial of service (DoS).

In one embodiment, a security analyzer can also test a DUA's overall security. These types of attacks include, for example, negotiating a lower (i.e., less secure) encryption algorithm, dictionary attacks (brute forcing commonly-used passwords), resource exhaustion, identifying misconfiguration of the DUA, identifying mechanisms for sending messages through the DUA that bypass various security checks, and detecting insecure implementations of standard protocols and information disclosure.

Referring again to FIG. 1, the security analyzer includes three components: one component to send a message to the DUA, one component to receive a message from the DUA, and one component to analyze whether the DUA operated correctly. If these components exist independently of each other, it is necessary to determine which message sent by the first component corresponds to which message received by the second component. If the security analyzer sends only one message at a time, it is relatively easy to determine the correspondence between the sent message and the received message.

However, the security analyzer can be used to send several messages simultaneously (or at least in close proximity to one another). This way, the security analyzer can subject the DUA to several different tests in a shorter period of time. If the security analyzer sends several messages to and receives several messages from the DUA, it is more difficult to determine the correspondences between each sent message and each received message.

In one embodiment, the security analyzer uses a single component to both send a message to and receive a message from the DUA. In this embodiment, it is easier for the security analyzer to determine which sent message corresponds to which received message, since they are sent and received by the same component.

Figure 2:
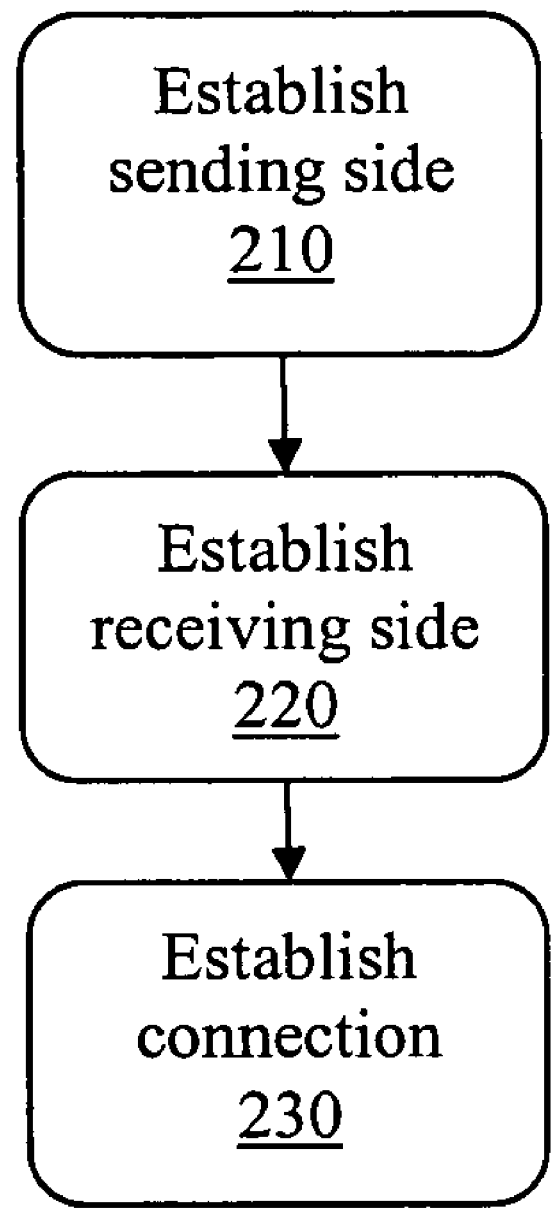
FIG. 2 illustrates a flow chart of a method for a single software application to act as both the sender and recipient of a message sent over a network connection, according to one embodiment of the invention.

In one embodiment, this single component is a single software application that acts as both the sender and recipient of a message sent over a network connection. FIG. 2 illustrates a flow chart of a method for a single software application to act as both the sender and recipient of a message sent over a network connection, according to one embodiment of the invention. In the illustrated embodiment, the network connection uses sockets and the Transmission Control Protocol (TCP), although any type of network connection can be used. The "sending interface" and "sending port" will be used to send a message to the DUA, and the "receiving interface" and "receiving port" will be used to receive a message from the DUA. In one embodiment, the sending port and the receiving port differ.

In step 210, the sending side of the connection is established. In one embodiment, this includes: a) creating a TCP socket, b) binding the socket to the sending interface and sending port, and c) enabling non-blocking read/writes for the socket. This socket will be referred to as the sending socket.

In step 220, the receiving side of the connection is established. In one embodiment, this includes: a) creating a TCP socket, b) binding the socket to the receiving interface and receiving port, c) enabling non-blocking read/writes for the socket, d) listening for incoming connections on the socket, and e) accepting incoming connections on the socket. This socket will be referred to as the receiving socket.

Note that steps 210 and 220 are independent of each other and, thus, can be performed in either order.

In step 230, a connection is established from the sending side through the DUA to the receiving side. In one embodiment, this includes: a) the sending socket sending a connection request through the DUA to the receiving socket (for example, by using an Internet Protocol (IP) address), b) the sending socket being selected for writing activity, c) the receiving socket being selected for reading activity, and d) the receiving socket accepting the incoming connection.

The above method can be used in many different ways. In one embodiment, the DUA is a decryption device. In this embodiment, the sending socket initiates an encrypted TCP-based Secure Sockets Layer (SSL) connection to the DUA. When the DUA receives an encrypted message, it decrypts the message and connects back to the receiving socket with a plain-text connection. For example, the sending (encrypted) side of the connection is via TCP port 443 (the standard port for secure HyperText Transfer Protocol (HTTP)), while the receiving (decrypted, plain-text) side of the connection is via TCP port 80 (the standard port for plain-text HTTP).

In one embodiment, the sending socket or the receiving socket acts like a client, a server, or both.

The above method can also be used to perform automatic discovery on the DUA. For example, the security analyzer interrogates the DUA to determine its capabilities. In one embodiment, the security analyzer sends and receives messages through the DUA in order to determine whether the DUA is performing Network Address Translation (NAT). For example, if the DUA is a router, then the security analyzer determines whether the router is NAT-enabled.

Network Address Translation comprises changing the source address of a received message before transmitting the message. In other words, a device that performs NAT modifies the received message before transmitting it. The security analyzer can determine whether a DUA is NAT-enabled by comparing the message that it sent to the DUA with the message that it received from the DUA.

Figure 3:
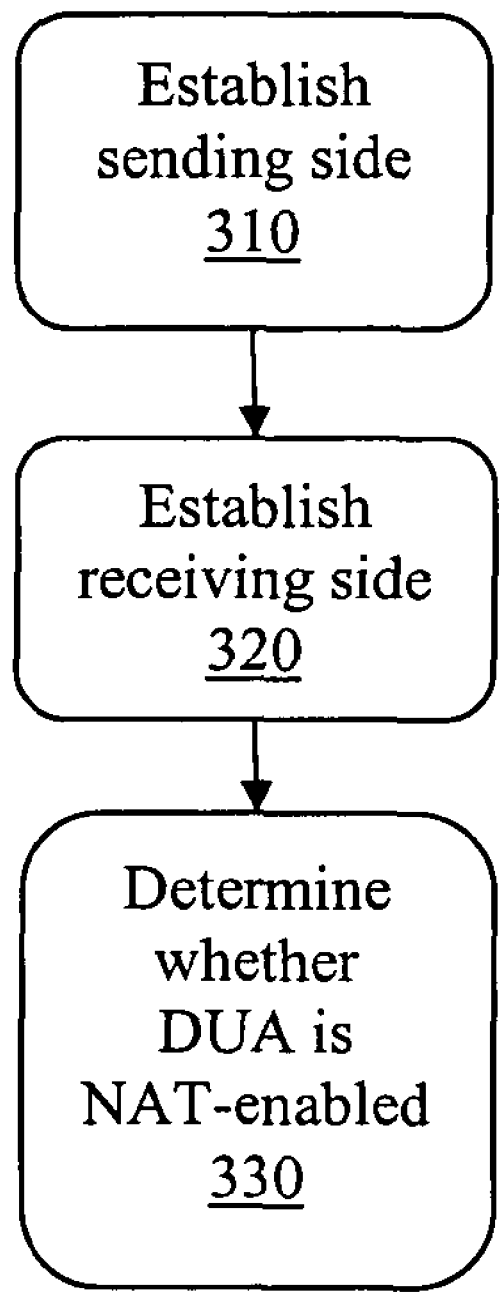
FIG. 3 illustrates a flow chart of a method for a single software application to determine whether a DUA is NAT-enabled, according to one embodiment of the invention.

FIG. 3 illustrates a flow chart of a method for a single software application to determine whether a DUA is NAT-enabled, according to one embodiment of the invention. In the illustrated embodiment, the network connection uses sockets and the User Datagram Protocol (UDP), although any type of network connection can be used. The "sending interface" and "sending port" will be used to send a message to the DUA, and the "receiving interface" and "receiving port" will be used to receive a message from the DUA. In one embodiment, the sending port and the receiving port differ.

In step 310, the sending side of the connection is established. In one embodiment, this includes: a) creating a UDP socket and b) binding the socket to the sending interface. This socket will be referred to as the sending socket.

In step 320, the receiving side of the connection is established. In one embodiment, this includes: a) creating a UDP socket, b) binding the socket to the receiving interface and receiving port (for example, UDP port 53, which is commonly used for Domain Name Services (DNS)), and c) enabling non-blocking read/writes for the socket. This socket will be referred to as the receiving socket.

Note that steps 310 and 320 are independent of each other and, thus, can be performed in either order.

In step 330, the security analyzer determines whether the DUA is NAT-enabled. In one embodiment, this includes: a) the sending socket sending an empty UDP packet through the DUA to the receiving socket and b) comparing the sent packet with the received packet. If the source address of the sent packet is different than the source address of the received packet, then the DUA is NAT-enabled. If the addresses are the same, then the DUA is not NAT-enabled.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

APPENDIX A

Networking protocols include, for example, Address Resolution Protocol (ARP), Border Gateway'Protocol (BGP), Cisco Discovery Protocol (CDP), Dynamic Host Configuration Protocol (DHCP), File Transfer Protocol (FTP), Trivial File Transfer Protocol (TFTP), HyperText Transfer Protocol (HTTP), Internet Control Message Protocol (ICMP), Internet Protocol version 4 (IPv4), Internet Protocol version 6 (IPv6), Internet Security Association and Key Management Protocol (ISAKMP), Light Weight Directory Access Protocol (LDAP), Open Shortest Path First (OSPF), Post Office Protocol 3 (POP3), Remote Authentication Dial-In User Service (RADIUS; including extensions from Cisco Systems, Juniper Networks, and Microsoft), Routing Information Protocol (RIP), Session Initiation Protocol (SIP), Server Message Block (SMB), Remote Administration Protocol (RAP), Simple Mail Transfer Protocol (SMTP), Multipurpose Internet Mail Extension (MIME), Simple Network Management Protocol (SNMP; including SNMP trap), Secure Shell (SSH), Secure Sockets Layer (SSL), Transport Layer Security (TLS), Terminal Access Controller Access Control System Plus (TACACS+), Transmission Control Protocol (TCP), Universal Plug and Play (UPnP), User Datagram Protocol (UDP), and Voice over Internet Protocol (VoIP). Networking protocols also include, for example, any protocol defined by an Internet Engineering Task Force (IETF) Request for Comments (RFC).

Application program interfaces (APIs) include, for example, ActiveX, Common Object Request Broker Architecture (CORBA), Interface Definition Language (IDL), Internet Inter-ORB Protocol (IIOP), Java Remote Method Invocation (Java RMI), Management Information Base (MIB), Server Message Block (SMB), Simple Object Access Protocol (SOAP), and Sun Microsystems Remote Procedure Call (SunRPC; including portmapper and statd).

File formats include, for example, image formats, audio formats, multimedia formats, and text formats. Image file formats include, for example, Graphic Interchange Format (GIF), Joint Photographic Experts Group (JPEG), Microsoft Windows Bitmap (BMP), Portable Document Format (PDF), Portable Network Graphics (PNG), and Tagged Image File Format (TIFF). Audio file formats include, for example, MPEG-1 Audio Layer 3 (MP3; Moving Picture Experts Group), MPEG-2 Part 7 (AAC; Advanced Audio Coding), Microsoft Windows Media Audio (WMA), and RealNetworks RealAudio. Multimedia formats include, for example, Apple QuickTime, Microsoft Windows Media Video (WMV), and Adobe Flash. Text file formats include, for example, Document Type Definition (DTD), eXtensible Markup Language (XML), X. 509 (public key certificates), and Microsoft Word (DOC).

APPENDIX B

Structure attacks are generally based on messages that contain values or parameters that violate an intended protocol. Types of structure attacks include, for example: empty-field, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, and wrong-encoding.

One example of a semantics attack is a message that indicates an invalid (e.g., non-existent) printer instead of a valid printer. This can cause a software application to hang or crash unexpectedly. Another example of a semantics attack is a network packet with a source IP address of "all-broadcast." Responding to this packet would therefore generate enough packets to flood the network. Types of structure attacks include, for example: fmt-string (format), fragmented-field, invalid-encoding, invalid-field, invalid-ip (IP address), invalid-path, invalid-string, recursion, self-reference, and null-char (character).

One example of a state attack is sending messages out-of-order (e.g., with respect to the type of message the DUA is expecting to receive).

What is claimed is:

1. A security analyzer device for analyzing vulnerability of a pass-through network device under analysis (DUA) to protocol abuse of a network communications protocol, the security analyzer device comprising:
   at least two ports for making network connections to other devices;
   a computer processor for executing computer program instructions; and
   a computer-readable storage medium having executable computer program instructions for a single software application tangibly embodied thereon, the executable computer program instructions for the single software application comprising instructions for the computer processor to perform the steps of:
   establishing a network connection for the sending of messages from a sender through the pass-through network DUA to a receiver, the single software application acting as both the sender and the receiver, wherein establishing the network connection comprises:
      establishing a sending side of the network connection from a sending port of the security analyzer device to the pass-through network DUA, the sending port acting as a port of the sender;
      establishing a receiving side of the network connection from the pass-through network DUA to a receiving port of the security analyzer device, the receiving port being a different port than the sending port and the receiving port acting as a port of the receiver; and
      establishing a connection from the sending side of the network connection through the pass-through network DUA to the receiving side of the network connection;
   sending multiple test messages from the sender to the receiver, the test messages probing vulnerability of the pass-through network DUA to protocol abuse of the network communications protocol, the test messages sent from the sending port to the pass-through network DUA via the sending side of the network connection;
   receiving multiple response messages corresponding to the test messages, wherein the response messages are received from the pass-through network DUA at the receiving port via the receiving side of the network connection; and
   determining whether the pass-through network DUA has vulnerabilities by analyzing the sent test messages and the corresponding received response messages.

2. The security analyzer device of claim 1 wherein at least some of the test messages are invalid with respect to the network communications protocol.

3. The method of claim 2, wherein the steps further include:
mutating valid messages to create the invalid test messages.

4. The method of claim 2, wherein at least some of the test messages are malformed test message, and the steps further include:
mutating well-formed messages to create the malformed test messages.

5. The security analyzer device of claim 1 wherein at least some of the test messages are malformed with respect to the network communications protocol.

6. The method of claim 5, wherein the step further include:
mutating well-formed messages to create the malformed test messages.

7. The security analyzer device of claim 1 wherein at least some of the test messages are valid with respect to the network communications protocol but are inappropriate based on the pass-through network DUA's state.

8. The security analyzer device of claim 1 wherein the pass-through network DUA comprises multiple devices communicatively coupled to each other.

9. The security analyzer device of claim 1 wherein the security analyzer device is communicatively separated from the pass-through network DUA by an intervening device.

10. The security analyzer device of claim 1 wherein:
the single software application sends additional test messages before receiving response messages corresponding to previously sent test messages; and
the step of analyzing the sent test messages and the corresponding received response messages comprises:
determining which received responses messages correspond to which sent test messages; and
comparing the corresponding response messages and test messages.

11. The security analyzer device of claim 1 wherein:
establishing the sending side of the network connection further comprises:
creating a sending socket,
binding the sending socket to the sending port, and
enabling non-blocking reads/writes for the sending socket;
establishing the receiving side of the network connection further comprises:
creating a receiving socket,
binding the receiving socket to the receiving port, and
enabling non-blocking reads/writes for the receiving socket; and
establishing the connection through the pass-through network DUA further comprises:
sending a connection request from the sending socket through the pass-through network DUA to the receiving socket,
selecting the sending socket for writing activity,
selecting the receiving socket for reading activity, and
accepting the connection request by the receiving socket.

12. The security analyzer device of claim 1 wherein the executable computer program instructions for the single software application further comprises instructions for the computer processor to perform the steps of:
sending additional test messages from the receiver to the sender, the additional test messages probing vulnerability of the pass-through network DUA to protocol abuse of the network communications protocol, the additional test messages sent to the pass-through network DUA via the receiving side of the network connection;
receiving additional response messages corresponding to the additional test messages, wherein the additional response messages are received from the pass-through network DUA via the sending side of the network connection; and
determining whether the pass-through network DUA has vulnerabilities by analyzing the sent additional test messages and the corresponding received additional response messages.

13. The security analyzer of claim 1, wherein the sending side of the network connection does not pass through the network DUA.

14. The security analyzer of claim 1, wherein the receiving side of the network connection does not pass through the network DUA.

15. The security analyzer of claim 14, wherein the sending side of the network connection does not pass through the network DUA.

16. A method for analyzing vulnerability of a pass-through network device under analysis (DUA) to protocol abuse of a network communications protocol, the method implemented by a security analyzer device having at least two ports and a single software application executing on the security analyzer device, the method comprising the single software application performing the steps of:
establishing a network connection for the sending of messages from a sender through the pass-through network DUA to a receiver, the single software application acting as both the sender and the receiver, wherein establishing the network connection comprises:
establishing a sending side of the network connection from a sending port of the security analyzer device to the pass-through network DUA, the sending port acting as a port of the sender;
establishing a receiving side of the network connection from the pass-through network DUA to a receiving port of the security analyzer device, the receiving port being a different port than the sending port and the receiving port acting as a port of the receiver; and
establishing a connection from the sending side of the network connection through the pass-through network DUA to the receiving side of the network connection;
sending multiple test messages from the sender to the receiver, the test messages probing vulnerability of the pass-through network DUA to protocol abuse of the network communications protocol, the test messages sent from the sending port to the pass-through network DUA via the sending side of the network connection;
receiving multiple response messages corresponding to the test messages, wherein the response messages are received from the pass-through network DUA at the receiving port via the receiving side of the network connection; and
determining whether the pass-through network DUA has vulnerabilities by analyzing the sent test messages and the corresponding received response messages.

17. The method of claim 16 wherein the at least some of the test messages are invalid with respect to the network communications protocol.

18. The method of claim 17, further comprising:
mutating valid messages to create the invalid test messages.

19. The method of claim 16 wherein at least some of the test messages are malformed with respect to the network communications protocol.

20. The method of claim 19, further comprising:
mutating well-formed messages to create the malformed test messages.

21. The method of claim 16 wherein at least some of the test messages are valid with respect to the network communications protocol but are inappropriate based on the pass-through network DUA's state.

22. The method of claim 16 wherein the pass-through network DUA comprises multiple devices communicatively coupled to each other.

23. The method of claim 16 wherein the security analyzer device is communicatively separated from the pass-through network DUA by an intervening device.

24. The method of claim 16 wherein:
the step of sending multiple test messages comprises sending additional test messages before receiving response messages corresponding to previously sent test messages; and
the step of analyzing the sent test messages and the corresponding received response messages comprises:
determining which received responses messages correspond to which sent test messages; and
comparing the corresponding response messages and test messages.

25. The method of claim 16 wherein:
establishing the sending side of the network connection further comprises:
creating a sending socket,
binding the sending socket to the sending port, and
enabling non-blocking reads/writes for the sending socket;
establishing the receiving side of the network connection further comprises:
creating a receiving socket,
binding the receiving socket to the receiving port, and
enabling non-blocking reads/writes for the receiving socket; and
establishing the connection through the pass-through network DUA further comprises:
sending a connection request from the sending socket through the pass-through network DUA to the receiving socket,
selecting the sending socket for writing activity,
selecting the receiving socket for reading activity, and
accepting the connection request by the receiving socket.

26. The method of claim 16, further comprising:
sending additional test messages from the receiver to the sender, the additional test messages probing vulnerability of the pass-through network DUA to protocol abuse of the network communications protocol, the additional test messages sent to the pass-through network DUA via the receiving side of the network connection;
receiving additional response messages corresponding to the additional test messages, wherein the additional response messages are received from the pass-through network DUA via the sending side of the network connection; and
determining whether the pass-through network DUA has vulnerabilities by analyzing the sent additional test messages and the corresponding received additional response messages.

27. The method of claim 16, wherein the sending side of the network connection does not pass through the network DUA.

28. The method of claim 16, wherein the receiving side of the network connection does not pass through the network DUA.

29. The method of claim 28, wherein the sending side of the network connection does not pass through the network DUA.

30. A computer-readable recording medium having executable computer program instructions for a single software application stored thereon, the executable computer program instructions comprising instructions for performing the steps of:
establishing a network connection for the sending of messages from a sender through a pass-through network DUA to a receiver, the single software application acting as both the sender and the receiver, wherein establishing the network connection comprises:
establishing a sending side of the network connection from a sending port of a security analyzer device to the pass-through network DUA, the sending port acting as a port of the sender;
establishing a receiving side of the network connection from the pass-through network DUA to a receiving port of the security analyzer device, the receiving port being a different port than the sending port and the receiving port acting as a port of the receiver; and
establishing a connection from the sending side of the network connection through the pass-through network DUA to the receiving side of the network connection;
sending multiple test messages from the sender to the receiver, the test messages probing vulnerability of the pass-through network DUA to protocol abuse of the network communications protocol, the test messages sent from the sending port to the pass-through network DUA via the sending side of the network connection;
receiving multiple response messages corresponding to the test messages, wherein the response messages are received from the pass-through network DUA at the receiving port via the receiving side of the network connection; and
determining whether the pass-through network DUA has vulnerabilities by analyzing the sent test messages and the corresponding received response messages.

31. The computer-readable recording medium of claim 30, wherein the executable computer program instructions further comprises instructions for performing the steps of:
sending additional test messages from the receiver to the sender, the additional test messages probing vulnerability of the pass-through network DUA to protocol abuse of the network communications protocol, the additional test messages sent to the pass-through network DUA via the receiving side of the network connection;
receiving additional response messages corresponding to the additional test messages, wherein the additional response messages are received from the pass-through network DUA via the sending side of the network connection; and
determining whether the pass-through network DUA has vulnerabilities by analyzing the sent additional test messages and the corresponding received additional response messages.

32. The recording medium of claim 30, wherein the receiving side of the network connection does not pass through the network DUA.

33. The recording medium of claim 30, wherein the sending side of the network connection does not pass through the network DUA.

34. The recording medium of claim 33, wherein the receiving side of the network connection does not pass through the network DUA.

35. The recording medium of claim 30, wherein at least some of the test messages are invalid messages, and the steps further include: mutating valid messages to create the invalid test messages.

* * * * *